United States Patent
Shin et al.

(10) Patent No.: US 11,833,801 B2
(45) Date of Patent: Dec. 5, 2023

(54) SEALER FOR BODY PANEL REINFORCEMENT

(71) Applicants: HYUNDAI MOTOR COMPANY, Seoul (KR); KIA CORPORATION, Seoul (KR)

(72) Inventors: Sungchul Shin, Incheon (KR); Ineui Jee, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/517,834

(22) Filed: Nov. 3, 2021

(65) Prior Publication Data

US 2022/0219426 A1 Jul. 14, 2022

(30) Foreign Application Priority Data

Jan. 8, 2021 (KR) .................. 10-2021-0002474

(51) Int. Cl.
- *B32B 5/02* (2006.01)
- *B32B 15/14* (2006.01)
- *B32B 15/18* (2006.01)
- *B32B 27/38* (2006.01)

(52) U.S. Cl.
CPC ............. *B32B 5/024* (2013.01); *B32B 15/14* (2013.01); *B32B 15/18* (2013.01); *B32B 27/38* (2013.01); *B32B 2255/02* (2013.01); *B32B 2255/06* (2013.01); *B32B 2260/021* (2013.01); *B32B 2260/046* (2013.01); *B32B 2262/101* (2013.01); *B32B 2307/546* (2013.01);

(Continued)

(58) Field of Classification Search
CPC ....... B32B 15/092; B32B 27/18; B32B 27/38; B32B 2307/732; B32B 2605/00; B32B 2307/546; B32B 2307/56; B32B 2255/26; B32B 27/08; B32B 27/20; B32B 2307/50; B32B 2307/72; B32B 2605/08; B32B 2260/021; B32B 2260/046; B32B 2262/101; B60J 10/80; B60R 13/06; C08J 2363/02; C08J 5/043; C08J 2377/00
See application file for complete search history.

(56) References Cited

U.S. PATENT DOCUMENTS

| | | | |
|---|---|---|---|
| 2003/0054173 A1* | 3/2003 | Ruddy | C08G 59/226 428/413 |
| 2008/0051524 A1* | 2/2008 | Ji | C09J 163/00 525/476 |

(Continued)

FOREIGN PATENT DOCUMENTS

| | | | | |
|---|---|---|---|---|
| WO | WO-2010135249 A1 * | 11/2010 | | B21J 15/025 |
| WO | WO-2016014536 A1 * | 1/2016 | | C07D 303/18 |
| WO | WO-2019126550 A1 * | 6/2019 | | B32B 15/02 |

OTHER PUBLICATIONS

Patel, Jignesh et al., Effect of Fabric Structure and Polymer Matrix on Flexural Strength, Interlaminar Shear Stress, and ENergy Disspation of Glass Fiber-Reinforced Polymer Composite, Textile Research Journal, vol. 86(2), 2016, p. 127-137.*

*Primary Examiner* — Jennifer A Gillett
(74) *Attorney, Agent, or Firm* — McDonnell Boehnen Hulbert & Berghoff LLP

(57) ABSTRACT

A sealer for body panel reinforcement includes a sealer layer on a panel for a vehicle body, and a skin layer disposed on the sealer layer and including glass fiber reinforced plastic.

2 Claims, 1 Drawing Sheet

(52) U.S. Cl.
CPC ....... *B32B 2307/56* (2013.01); *B32B 2307/72* (2013.01); *B32B 2307/732* (2013.01); *B32B 2605/00* (2013.01)

(56) References Cited

U.S. PATENT DOCUMENTS

| | | | | |
|---|---|---|---|---|
| 2010/0003506 | A1* | 1/2010 | Desai | B05D 7/16 |
| | | | | 428/335 |
| 2010/0048749 | A1* | 2/2010 | Takata | B32B 15/046 |
| | | | | 521/182 |
| 2015/0174791 | A1* | 6/2015 | Dauphin | B29C 44/04 |
| | | | | 427/373 |
| 2017/0342196 | A1* | 11/2017 | Neumayer | C08G 59/686 |
| 2019/0375185 | A1* | 12/2019 | Kratzer | B29C 70/462 |
| 2021/0309819 | A1* | 10/2021 | Yamane | C08J 5/249 |
| 2022/0081043 | A1* | 3/2022 | Koga | B32B 15/18 |

* cited by examiner

SEALER FOR BODY PANEL REINFORCEMENT

CROSS REFERENCE TO RELATED APPLICATIONS

This application claims priority to and the benefit of Korean Patent Application No. 10-2021-0002474 filed in the Korean Intellectual Property Office on Jan. 8, 2021, the entire contents of which are incorporated herein by reference.

BACKGROUND

(a) Field

The present disclosure relates to a sealer for body panel reinforcement for reinforcing rigidity of a body panel such as a door and a quarter panel of a vehicle.

(b) Description of the Related Art

A body of a vehicle may be largely divided into a vehicle body, an exterior part, and an interior part. Herein, the vehicle body forming appearance of the vehicle may include an outer plate panel, an inner plate panel, a reinforcing panel, a sub frame, and the like. In the vehicle body, side panels, door panels, floor panels, loop panels, and the like consisting of a center body make passengers' boarding space.

A sealer for reinforcing rigidity of the vehicle body may be provided between the outer plate panel and inner plate panel.

When the sealer for reinforcing rigidity of the vehicle body has low flexural strength, rigidity is weak, but when flexural strength is high, hardness is increased, causing dents on the outer plate panel.

SUMMARY

An embodiment provides a sealer for body panel reinforcement that may further improve rigidity without a dent on the outer plate, thereby reducing the panel thickness, and minimizing the addition of members/brackets to reduce costs.

According to an embodiment, a sealer for body panel reinforcement includes a sealer layer on a panel for a vehicle body, and a skin layer disposed on the sealer layer and including glass fiber reinforced plastic.

A fineness of the glass fibers of the glass fiber reinforced plastic may be about 30 deniers to about 60 deniers.

A density (thread count) of the glass fibers of the glass fiber reinforced plastic may be about 60 threads and about 80 threads.

The glass fiber reinforced plastic may include glass fibers and a matrix resin combined with glass fibers.

The matrix resin may include about 50 wt % to about 60 wt % of bisphenol A epoxy, about 30 wt % to about 40 wt % of polyamide, and 5 wt % to 10 wt % of urea based on the total weight of the matrix resin.

A thickness of the skin layer may be about 0.45 mm to about 0.75 mm.

A thickness of the sealer layer may be about 1.0 mm to about 1.5 mm.

The sealer layer may include about 30 wt % to about 50 wt % of an epoxy resin, about 3 wt % to about 10 wt % of a curing agent, about 1 wt % to about 5 wt % of an adhesion imparting agent, about 13 wt % to about 35 wt % of a filler, about 1 wt % to about 10 wt % of a moisture absorbent, about 3 wt % to about 5 wt % of a flow inhibitor, and about 1 wt % to about 2 wt % of a stabilizer.

The sealer for body panel reinforcement according to an embodiment may further improve rigidity without a dent on the outer plate, thereby reducing the panel thickness and minimizing the addition of members/brackets, thereby reducing costs.

DETAILED DESCRIPTION

Figure 1:
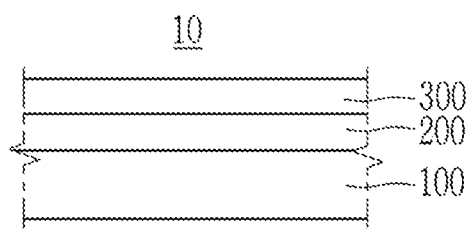
FIG. 1 is a cross-sectional view schematically illustrating a sealer for body panel reinforcement according to an embodiment.

The advantages and features of the present disclosure and the methods for accomplishing the same will be apparent from the embodiments described hereinafter with reference to the accompanying drawings. However, the embodiments should not be construed as being limited to the embodiments set forth herein. Unless otherwise defined, all terms (including technical and scientific terms) used herein have the same meaning as commonly understood by one of ordinary skill in the art. The terms defined in a generally-used dictionary may not be interpreted ideally or exaggeratedly unless clearly defined. In addition, unless explicitly described to the contrary, the word "comprise," and variations such as "comprises" or "comprising," will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

A sealer for body panel reinforcement according to an embodiment includes a sealer layer on a panel for a vehicle body, and a skin layer on the sealer layer.

FIG. 1 is a cross-sectional view schematically illustrating a sealer for body panel reinforcement according to an embodiment. Referring to FIG. 1, the sealer for body panel reinforcement is specifically described.

The vehicle body forming the exterior of the vehicle may be provided by combining an outer plate panel and an inner plate panel. The sealer 10 for body panel reinforcement may be provided between the outer plate panel and the inner plate panel of the vehicle body or provided on the inner surface of the outer plate panel in order to reinforce the rigidity of the vehicle body and improve vibration damping properties.

The sealer 10 for body panel reinforcement may be disposed on the panel 100 such as an outer plate panel or an inner plate panel. The panel 100 may be, for example, a steel plate, but any material of the panel 100 may be used as long as it can be used as a vehicle body, and the present disclosure is not particularly limited thereto.

The sealer layer 200 may be manufactured by curing a composition for a sealer including an epoxy resin.

The epoxy resin serves to improve hardness and strength of the sealer layer 200. The composition for the sealer may include, for example, a bisphenol A epoxy resin as an epoxy resin.

The epoxy resin may be included in an amount of about 30 wt % to about 50 wt %, for example about 30 wt % to about 40 wt %, about 40 wt % to about 50 wt %, or about 35 wt % to about 45 wt % based on the total weight of the composition for a sealer. When the content of the epoxy resin is less than about 30 wt %, the shear strength may be reduced, while when it exceeds about 50 wt %, the discharge property may be reduced, and dents may occur in the panel 100.

The composition for a sealer may include a curing agent for curing the epoxy resin. For example, the curing agent for curing the epoxy resin may be dicyandiamide. The dicyandiamide may provide adhesion of the sealer layer 200 to the panel 100.

The curing agent may be included in an amount of about 3 wt % to about 10 wt %, for example about 6 wt % to about 10 wt %, or about 6 wt % to about 7 wt % based on the total weight of the sealer composition. When the content of the curing agent is less than about 3 wt %, it may be uncured to reduce shear adhesion, while when it exceeds about 7 wt %, it may be overcured and impact resistance may be reduced.

The composition for the sealer may further include an adhesion imparting agent for endowing adhesion of the sealer layer 200 to the panel 100. The adhesion imparting agent may be, for example, a silane. The adhesion imparting agent may be included in an amount of about 1 wt % to about 5 wt %, for example, about 3 wt % to about 5 wt %, based on the total weight of the composition for the sealer. When the content of the adhesion imparting agent is less than about 1 wt %, adhesion with the panel 100 may be reduced, while when the content of the adhesion imparting agent is greater than about 5 wt %, the cohesive force between the adhesion imparting agents may be reduced.

The composition for the sealer may further include calcium carbonate as a filler. The filler may impart fillability, ejection properties, and flowability to the sealer composition. The filler may be included in an amount of about 13 wt % to about 35 wt %, for example, about 17 wt % to about 35 wt %, or about 25 wt % to about 35 wt % based on the total weight of the composition for the sealer. When the content of the filler is less than about 13 wt %, ejection properties and flowability (workability) may be reduced, and if it exceeds about 35 wt %, shear strength may be reduced.

The composition for the sealer may further include a moisture absorbent for removing moisture from the composition. The moisture absorbent may be, for example, calcium oxide (CaO). The moisture absorbent may be included in an amount of about 1 wt % to about 10 wt %, for example, about 2 wt % to about 10 wt %, or about 5 wt % to about 10 wt % based on the total weight of the composition for the sealer. When the content of the moisture absorbent is less than about 1 wt %, moisture may not be sufficiently removed, the composition for the sealer may swell due to moisture, while when it exceeds about 10 wt %, adhesion and shear strength may be reduced.

The composition for the sealer may further include a flow inhibitor to prevent flow of the composition. The flow inhibitor may be, for example, bentonite. The flow inhibitor may be included in an amount of about 3 wt % to about 5 wt % based on the total weight of the composition for the sealer. When the content of the flow inhibitor is less than about 3 wt %, the flowability may be reduced, while when it exceeds about 5 wt %, the adhesion may be reduced.

The composition for the sealer may further include a stabilizer serving to stabilize heat resistance. The stabilizer may be, for example, tin oxide. The stabilizer may be included in an amount of about 1 wt % to about 2 wt % based on the total weight of the composition for the sealer. When the content of the stabilizer is less than about 1 wt %, it may be difficult to secure sufficient heat resistance, while when it exceeds about 2 wt %, adhesion may be reduced.

On the other hand, as the thickness of the panel 100 is reduced in order to reduce the weight of the vehicle body, rigidity reinforcement is further required. However, when the rigidity of the sealer layer 200 is increased, an outer plate dent may occur. Accordingly, by providing the skin layer 300 on the sealer layer 200, the rigidity may be further improved without a dent on the outer plate.

In addition, the skin layer 300 may reinforce the rigidity of the panel 100 without adding a member/bracket, and as the skin layer 300 is installed, the thickness of the sealer layer 200 may also be adjusted downward, thereby reducing costs.

Accordingly, the thickness of the sealer layer 200 may be about 1.0 mm to about 1.5 mm. When the thickness of the sealer layer is less than about 1.0 mm, vibration damping properties may be less than about 0.02, which is a requirement, while when the thickness of the sealer layer 200 exceeds about 1.5 mm, dents may occur on the outer plate of the vehicle body.

The thickness of the skin layer 300 may be about 0.45 mm to about 0.75 mm. When the thickness of the skin layer 300 is less than about 0.45 mm, flexural strength may be reduced, while when it exceeds about 0.75 mm, vibration damping properties may not meet the requirements.

The skin layer 300 may include a glass fiber reinforced plastic. The glass fiber reinforced plastic may include glass fibers and a matrix resin combined with glass fibers.

In this case, the vibration damping properties of the skin layer 300 are affected not only by the thickness of the skin layer 300, but also by the fineness and density of the glass fibers constituting the skin layer 300.

The fineness of the glass fibers may be about 30 deniers to about 60 deniers, for example, about 40 deniers to about 50 deniers. When the fineness of the glass fibers is less than about 30 deniers, the flexural strength of the sealer 10 for body panel reinforcement may be less than 20 kgf, which may not meet the requirements. When it exceeds about 60 deniers, the vibration damping properties may be about 0.01, which may be less than the requirement of 0.02. Here, the fineness (denier) means the weight of 9,000 m of yarn (g/9,000 m=D).

Further, the density (thread count) of the glass fibers may be about 60 threads and about 80 threads, for example about 70 threads to about 80 threads. When the density of the glass fibers is less than about 60 threads, the flexural strength of the sealer 10 for body panel reinforcement may be less than 20 kgf, which may not meet the requirements. When it exceeds about 80 threads, the vibration damping properties may be about 0.01, which may be less than the requirement of 0.02. Here, the density (thread count) means how many weft (horizontal threads) and warp threads (lengthwise threads) are woven in one square inch.

The skin layer 300 may be manufactured by impregnating the glass fibers in the matrix resin and then curing them.

Accordingly, the sealer 10 for body panel reinforcement does not cause a problem in which the boundary portion is rusted and separated.

The matrix resin may include about 50 wt % to about 60 wt % of bisphenol A epoxy, about 30 wt % to about 40 wt % of polyamide, and about 5 wt % to about 10 wt % of urea based on the total weight of the matrix resin.

The bisphenol A epoxy imparts basic physical properties to the matrix resin. When the content of bisphenol A epoxy is less than about 50 wt %, the hardness and adhesion of the matrix resin may decrease, and when it exceeds about 60 wt %, the hardness of the matrix resin increases and crash performance may be degraded.

The polyamide may serve to cure the epoxy. When the content of polyamide is less than about 30 wt %, the matrix resin may be uncured, and when it exceeds about 40 wt %, the matrix resin may be overcured.

The urea may serve to shorten the curing time of the matrix resin. When the content of urea is less than about 5 wt %, the curing time may be excessive, while when it exceeds about 10 wt %, adhesive properties of the matrix resin may be deteriorated.

Hereinafter, specific embodiments of the disclosure are presented. However, the examples described below are only for specifically illustrating or explaining the disclosure, and the scope of the disclosure is not limited thereto.

Method for Evaluating Physical Properties

Shear strength (Mpa): After coating a composition for a sealer on a 100×25×1.6 mm steel plate and then, attaching a 12.5 mm-wide tape at the end thereof, while the same steel plate was stacked thereon to overlap with only a region coated with the composition for a sealer and then, fixed with a clamp, the composition for a sealer was cured. The stacked steel plates were allowed to stand at room temperature for 1 hour and stretched at 5 mm/min in a tensile tester to measure a maximum load.

(2) Flexural strength (kgf): A sample was prepared by coating and curing a composition for a sealer to have a thickness of 1.5 mm on a 25×150×0.75 mm steel plate and then, allowed to stand at room temperature for 1 hour or longer and loaded at 5 mm/min to measure flexural strength (kgf).

Figure 2:
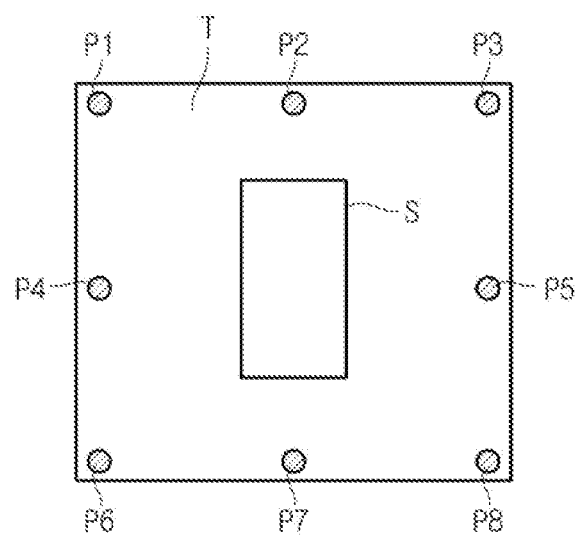
FIG. 2 is a plan view showing a specimen for measuring the cold-resistant flexibility of the sealer for body panel reinforcement.

(3) Cold-resistant flexibility (mm): As shown in FIG. 2, a sealer composition (S) was coated into a size of 150×80×1.5 mm in the center of a 300×300×0.75 mm steel plate (T) and then, heated and cured. The coated plate was allowed to stand at room temperature for 1 hour or longer and also, at −30° C. for 30 minutes, and then, deformation amounts at positions (P1 to P8) shown in FIG. 2 were measured at −30° C., and a maximum value among them was obtained as outer plate panel dent property.

(4) Vibration Damping Properties:

According to a theoretical measurement method, a degree of gentleness of a slope (peak) at the secondary resonance point may be measured. When a composition has excellent dustproof, amplitude decreases at a resonance point, and simultaneously, the slope becomes gentle. In other words, either one factor of the slope and the amplitude at the resonance point was measured to measure dustproof performance.

$$\text{Damping loss coefficient} = \hat{f}/f$$

In the formula above, f is frequency of the secondary resonance point, and ˆf is a frequency difference from that of a section that was 3 dB apart from the amplitude at the secondary resonance point.

In addition, according to a measurement method using an equipment, a sample in which a sealer for body panel reinforcement was formed into a thickness of 1.5 mm on a 20 mm×200 mm steel plate was applied with vibration in Exciter Tranducer and then, measured with respect to amplitude in Motion Tranducer.

The amplitude (dB) according to the frequency (Hz) was analyzed by PC, obtaining an analysis graph. As with the theoretical measurement method, the frequency (f) at the secondary resonance point and the frequency difference (Δf) between the frequency (f) at the secondary resonance point and frequency in the section that was 3 dB apart from the secondary resonance point was calculated.

In order to achieve the purpose of the present disclosure, targets for shear adhesion, flexural strength, cold-resistant flexibility, and vibration-damping properties of a sealer for body panel reinforcement are shown in Table 1.

TABLE 1

| Test Items | Target |
| --- | --- |
| Shear adhesion | 8 MPa or greater |
| Flexural strength | 20 kgf or greater |
| Cold-resistant flexibility | 1.7 mm or less |
| Vibration-damping properties | 0.02 or greater |

Experimental Example 1: Experiment on Material of Skin Layer

When glass fiber (glass wool) and glass fiber reinforced plastic (GFRP) were applied as a skin layer, flexural strength, cold-resistant flexibility, and vibration damping properties were evaluated, and the results are shown in Table 2.

TABLE 2

|  | Sealer layer Thickness (mm) | Skin layer material | Skin layer Thickness (mm) | Flexural strength (kgf) | Cold-resistant flexibility (mm) | Vibration damping properties |
| --- | --- | --- | --- | --- | --- | --- |
| Comparative Example 1-1 | 1.0 | — | — | 4.7 | 1.0 | 0.04 |
| Comparative Example 1-2 | 1.5 | — | — | 7.4 | 2.0 | 0.05 |
| Comparative Example 1-3 | 1.0 | GLASS WOOL | 0.20 | 7.7 | 1.0 | 0.03 |

TABLE 2-continued

|   | Sealer layer Thickness (mm) | Skin layer material | Skin layer Thickness (mm) | Flexural strength (kgf) | Cold-resistant flexibility (mm) | Vibration damping properties |
|---|---|---|---|---|---|---|
| Comparative Example 1-4 | 1.0 | GLASS WOOL | 0.32 | 9.8 | 1.0 | 0.03 |
| Example 1-1 | 1.0 | GFRP | 0.15 | 9.3 | 1.0 | 0.03 |
| Example 1-2 | 1.0 | GFRP | 0.32 | 16.7 | 1.0 | 0.03 |

Comparative Example 1-2 exhibited an increased thickness, compared with Comparative Example 1-1. Referring to Comparative Examples 1-1 and 1-2, as a thickness of a sealer was increased, flexural strength was improved, and thus a rigidity reinforcing effect was increased, but cold-resistant flexibility was deteriorated, which more possibly might cause dent in a vehicle body.

Accordingly, since the sealer even with an increased thickness alone was not applied to a vehicle, the skin layer was introduced thereinto.

Comparative Examples 1-3 and 1-4 exhibit evaluation results of using glass wool as a material for the skin layer, and Comparative Examples 1-5 and 1-6 exhibit evaluation results of using GFRP as a material for the skin layer. Referring to Comparative Examples 1-3 and 1-4, when 0.32 mm GFRP was applied, the highest flexural strength was obtained, which was the closest to the target of 20 kgf. Accordingly, GFRP is more advantageous to achieve the target flexural strength than the glass wool.

Experimental Example 2: Experiment on Thickness of Skin Layer

When glass fiber reinforced plastic (GFRP) was applied as a skin layer, while its thickness was changed, flexural strength, cold-resistant flexibility, and vibration damping properties thereof were evaluated, and the results are shown in Table 3.

TABLE 3

|   | Sealer layer Thickness (mm) | Skin layer Thickness (mm) | Flexural strength (kgf) | Cold-resistant flexibility (mm) | Vibration damping properties |
|---|---|---|---|---|---|
| Example 2-1 | 1.0 | 0.15 | 9.3 | 1.0 | 0.02 |
| Example 2-2 | 1.0 | 0.32 | 16.7 | 1.0 | 0.02 |
| Example 2-3 | 1.0 | 0.45 | 18.5 | 1.0 | 0.02 |
| Example 2-4 | 1.0 | 0.60 | 21.4 | 1.0 | 0.01 |
| Example 2-5 | 1.0 | 0.75 | 28.1 | 1.0 | 0.02 |
| Example 2-6 | 1.0 | 0.90 | 29.9 | 1.0 | 0.01 |

Referring to Table 3, as the thickness of the skin layer was increased, the flexural strength increased, but a trend related with vibration damping properties was difficult to find.

The skin layer exhibited sufficient vibration damping properties of 0.02 at a thickness of 0.45 mm and 0.75 mm but insufficient vibration damping properties of 0.01 at a thickness of 0.60 mm and 0.90 mm, which did not reach the target.

Accordingly, the thickness of the skin layer alone did not simultaneously improve flexural strength, cold-resistant flexibility, and vibration damping properties.

Experimental Example 3: Experiment on Fineness and Density of Skin Layer

When glass fiber reinforced plastic (GFRP) was applied as a skin layer, while fineness and density of glass fiber were changed, as shown in Table 4, flexural strength, cold-resistant flexibility, and vibration damping properties were evaluated, and the results are shown in Table 5.

TABLE 4

|   | Sealer layer | Skin layer | | |
|---|---|---|---|---|
|   | Thickness (mm) | Thickness (mm) | Fineness (D, denier) | Density (T, Thread) |
| Example 3-1 | 1.0 | 0.15 | 30 | 60 |
| Example 3-2 | 1.0 | 0.32 | 30 | 70 |
| Example 3-3 | 1.0 | 0.45 | 30 | 80 |
| Example 3-4 | 1.0 | 0.60 | 30 | 90 |
| Example 3-5 | 1.0 | 0.32 | 40 | 60 |
| Example 3-6 | 1.0 | 0.45 | 40 | 70 |
| Example 3-7 | 1.0 | 0.60 | 40 | 80 |
| Example 3-8 | 1.0 | 0.75 | 40 | 90 |
| Example 3-9 | 1.0 | 0.45 | 50 | 60 |
| Example 3-10 | 1.0 | 0.60 | 50 | 70 |
| Example 3-11 | 1.0 | 0.75 | 50 | 80 |
| Example 3-12 | 1.0 | 0.90 | 50 | 90 |
| Example 3-13 | 1.0 | 0.60 | 60 | 60 |
| Example 3-14 | 1.0 | 0.75 | 60 | 70 |
| Example 3-15 | 1.0 | 0.90 | 60 | 80 |
| Example 3-16 | 1.0 | 1.05 | 60 | 90 |

TABLE 5

|   | Flexural strength (kgf) | Cold-resistant flexibility (mm) | Vibration damping properties |
|---|---|---|---|
| Example 3-1 | 9.3 | 1.0 | 0.02 |
| Example 3-2 | 12.4 | 1.0 | 0.02 |
| Example 3-3 | 18.5 | 1.0 | 0.02 |
| Example 3-4 | 21.4 | 1.0 | 0.01 |
| Example 3-5 | 16.7 | 1.0 | 0.02 |
| Example 3-6 | 22.4 | 1.0 | 0.02 |
| Example 3-7 | 27.5 | 1.0 | 0.02 |
| Example 3-8 | 27.8 | 1.0 | 0.01 |
| Example 3-9 | 19.5 | 1.0 | 0.02 |
| Example 3-10 | 25.5 | 1.0 | 0.02 |
| Example 3-11 | 28.1 | 1.0 | 0.02 |
| Example 3-12 | 30.5 | 1.0 | 0.01 |
| Example 3-13 | 23.2 | 1.0 | 0.01 |
| Example 3-14 | 26.7 | 1.0 | 0.01 |
| Example 3-15 | 29.9 | 1.0 | 0.01 |
| Example 3-16 | 31.2 | 1.0 | 0.01 |

Referring to Tables 4 and 5, when the fineness of glass fiber was 30 deniers or less, the flexural strength was less than 20 kgf, which failed in meeting the requirement, but when the fineness of glass fiber was 60 denier or more, vibration damping properties was 0.01, which did not reach the target of 0.02.

In addition, when the density of glass fiber was 60 thread or less, the flexural strength was 20 kgf or less, which did not meet the requirement, but when the density of glass fiber was 90 thread or more, vibration damping properties were 0.01, which did not reach the target.

Accordingly, vibration damping properties of a sealer got affected by fineness and density of glass fiber constituting a skin layer as well as thickness of the skin layer.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

The invention claimed is:

1. A sealer for body panel reinforcement, comprising:
a panel, wherein the panel is a steel plate;
a sealer layer on the panel for a vehicle body; and
a skin layer disposed on the sealer layer, the skin layer including a glass fiber reinforced plastic comprising glass fibers woven as weft and warp threads;
wherein the glass fibers of the glass fiber reinforced plastic have a fineness in the range of about 40 deniers to about 50 deniers;
wherein a thread count of the glass fibers of the glass fiber reinforced plastic is about 70 threads and about 80 threads;
wherein a thickness of the skin layer is about 0.45 mm to about 0.75 mm;
wherein a thickness of the sealer layer is about 1.0 mm to about 1.5 mm; and
wherein a flexural strength of the sealer is 20 kgf or greater, a cold-resistant flexibility of the sealer is 1.7 mm or less, and a vibration-damping property of the sealer is 0.02 or greater.

2. The sealer of claim 1, wherein the glass fiber reinforced plastic comprises the glass fibers and a matrix resin combined with the glass fibers, and the matrix resin comprises about 50 wt % to about 60 wt % of bisphenol A epoxy, about 30 wt % to about 40 wt % of polyamide, and 5 wt % to 10 wt % of urea based on the total weight of the matrix resin.

* * * * *